(12) United States Patent
Seshadrinathan et al.

(10) Patent No.: US 9,792,687 B2
(45) Date of Patent: Oct. 17, 2017

(54) POINT-TO-POINT DISTANCE MEASUREMENTS IN 3D CAMERA IMAGES

(71) Applicant: Intel Corporation, Santa Clara, CA (US)

(72) Inventors: Kalpana Seshadrinathan, Santa Clara, CA (US); Oscar Nestares, San Jose, CA (US); Ali Mehdizadeh, Belmont, CA (US); Max T. Stein, Santa Clara, CA (US); Yi Wu, San Jose, CA (US); James Granger, Larkspur, CA (US)

(73) Assignee: Intel Corporation, Santa Clara, CA (US)

( * ) Notice: Subject to any disclaimer, the term of this patent is extended or adjusted under 35 U.S.C. 154(b) by 103 days.

(21) Appl. No.: 14/841,609

(22) Filed: Aug. 31, 2015

(65) Prior Publication Data

US 2017/0061624 A1    Mar. 2, 2017

(51) Int. Cl.
*G06T 7/00* (2017.01)
*G01B 11/14* (2006.01)
*H04N 5/247* (2006.01)

(52) U.S. Cl.
CPC ............ *G06T 7/0042* (2013.01); *G01B 11/14* (2013.01); *H04N 5/247* (2013.01); *G06T 2207/10012* (2013.01); *G06T 2207/10028* (2013.01)

(58) Field of Classification Search
None
See application file for complete search history.

(56) References Cited

U.S. PATENT DOCUMENTS

| 2009/0097772 | A1* | 4/2009 | Zhao | G06K 9/6248 |
| | | | | 382/263 |
| 2009/0299690 | A1 | 12/2009 | Joyner et al. | |
| 2010/0124369 | A1* | 5/2010 | Wu | G01B 11/02 |
| | | | | 382/141 |
| 2012/0275722 | A1* | 11/2012 | Yang | G06K 9/6211 |
| | | | | 382/294 |
| 2014/0218680 | A1 | 8/2014 | Wilson et al. | |
| 2015/0075018 | A1 | 3/2015 | Bridges et al. | |

OTHER PUBLICATIONS

International Search Report & Written Opinion, mailed Nov. 4, 2016, for PCT Patent Application No. PCT/US16/44897.

* cited by examiner

*Primary Examiner* — Delomia L Gilliard
(74) *Attorney, Agent, or Firm* — Green, Howard & Mughal, LLP

(57) ABSTRACT

Systems and methods for determining point-to-point distances from 3D image data. In some embodiments, two measure points, for example specified by a user, represent endpoints on an object of interest within an image frame. Assuming all points lying between these endpoints also belong to the object of interest, additional 3D data associated with points that lie along a measurement line defined by the measure points may be leveraged to provide a robust distance measurement. In some embodiments, total least squares fitting is performed, for example through Robust Principal Component Analysis (RPCA) to identify linear structures within the set of the 3D coordinates on the measurement line. In some exemplary embodiments, the minimum covariance determinant (MCD) estimator of the covariance matrix of the data is computed for a highly robust estimate of multivariate location and multivariate scatter.

11 Claims, 8 Drawing Sheets

POINT-TO-POINT DISTANCE MEASUREMENTS IN 3D CAMERA IMAGES

BACKGROUND

A digital camera is a component often included in commercial electronic media device platforms. Digital cameras are now available in wearable form factors (e.g., video capture earpieces, video capture headsets, video capture eyeglasses, etc.), as well as embedded within smartphones, tablet computers, and notebook computers, etc. Three-dimensional (3D) cameras are becoming more common, and can now be found on many mobile devices/platforms, including vehicles. These devices provide enhanced entertainment and utility experiences to an end user. For example, photography and vehicle control systems may be enhanced by depth (i.e., range) information output from the 3D camera. Existing technology to generate 3D camera images include stereo or multi-cameras, structured light systems comprising projected light patterns and cameras, time-of-flight (TOF) cameras, etc.

An important application enabled by 3D cameras is point-to-point measurement where the distance between two points on an image that are typically specified by the user, is measured in real world units, such as centimeters, etc. The simplest way to measure such a point-to-point distance is to utilize the range information, along with geometric calibration information, to compute 3D coordinates of the measurement points. Measurement of the intervening distance between the selected measurement points can then be computed. Such an approach to measurement suffers from several drawbacks, however. For example, range values are often noisy, introducing significant error when a pair of points are specified. Also, the technique is also susceptible to imprecise user input of the measurement location.

A more robust point-to-point distance measurement in 3D camera images is therefore advantageous.

BRIEF DESCRIPTION OF THE DRAWINGS

The material described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements. In the figures.

DETAILED DESCRIPTION OF EXEMPLARY EMBODIMENTS

Figure 1:
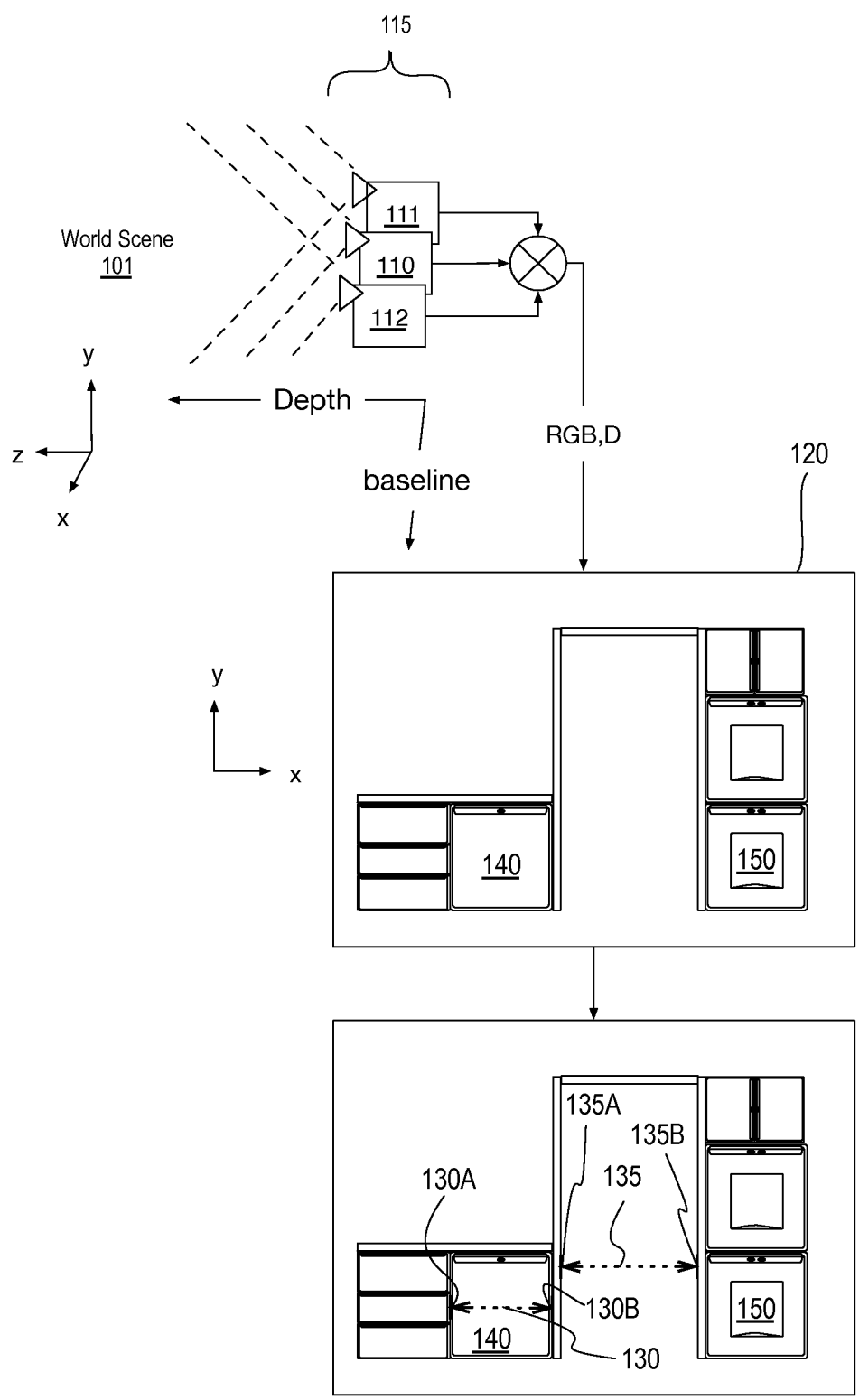
FIG. 1 is a schematic of point-to-point distance measurements in 3D camera images, in accordance with some embodiments.

One or more embodiments are described with reference to the enclosed figures. While specific configurations and arrangements are depicted and discussed in detail, it should be understood that this is done for illustrative purposes only. Persons skilled in the relevant art will recognize that other configurations and arrangements are possible without departing from the spirit and scope of the description. It will be apparent to those skilled in the relevant art that techniques and/or arrangements described herein may be employed in a variety of other systems and applications beyond what is described in detail herein.

Reference is made in the following detailed description to the accompanying drawings, which form a part hereof and illustrate exemplary embodiments. Further, it is to be understood that other embodiments may be utilized and structural and/or logical changes may be made without departing from the scope of claimed subject matter. Therefore, the following detailed description is not to be taken in a limiting sense and the scope of claimed subject matter is defined solely by the appended claims and their equivalents.

In the following description, numerous details are set forth, however, it will be apparent to one skilled in the art, that embodiments may be practiced without these specific details. Well-known methods and devices are shown in block diagram form, rather than in detail, to avoid obscuring more significant aspects. References throughout this specification to "an embodiment" or "one embodiment" mean that a particular feature, structure, function, or characteristic described in connection with the embodiment is included in at least one embodiment. Thus, the appearances of the phrase "in an embodiment" or "in one embodiment" in various places throughout this specification are not necessarily referring to the same embodiment. Furthermore, the particular features, structures, functions, or characteristics described in the context of an embodiment may be combined in any suitable manner in one or more embodiments. For example, a first embodiment may be combined with a second embodiment anywhere the particular features, structures, functions, or characteristics associated with the two embodiments are not mutually exclusive.

As used in the description of the exemplary embodiments and in the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items.

As used throughout the description, and in the claims, a list of items joined by the term "at least one of" or "one or more of" can mean any combination of the listed terms. For example, the phrase "at least one of A, B or C" can mean A; B; C; A and B; A and C; B and C; or A, B and C.

The terms "coupled" and "connected," along with their derivatives, may be used herein to describe functional or structural relationships between components. It should be understood that these terms are not intended as synonyms for each other. Rather, in particular embodiments, "connected" may be used to indicate that two or more elements are in direct physical, optical, or electrical contact with each other. "Coupled" may be used to indicated that two or more elements are in either direct or indirect (with other intervening elements between them) physical, optical, or electrical contact with each other, and/or that the two or more elements co-operate or interact with each other (e.g., as in a cause an effect relationship).

Some portions of the detailed descriptions provide herein are presented in terms of algorithms and symbolic representations of operations on data bits within a computer memory. Unless specifically stated otherwise, as apparent from the following discussion, it is appreciated that throughout the description, discussions utilizing terms such as "calculating," "computing," "determining" "estimating" "storing" "collecting" "displaying," "receiving," "consolidating," "generating," "updating," or the like, refer to the action and processes of a computer system, or similar electronic computing device, that manipulates and transforms data represented as physical (electronic) quantities within the computer system's circuitry including registers and memories into other data similarly represented as physical quantities within the computer system memories or registers or other such information storage, transmission or display devices.

While the following description sets forth embodiments that may be manifested in architectures, such system-on-a-chip (SoC) architectures for example, implementation of the techniques and/or arrangements described herein are not restricted to particular architectures and/or computing systems, and may be implemented by any architecture and/or computing system for similar purposes. Various architectures employing, for example, multiple integrated circuit (IC) chips and/or packages, and/or various computing devices and/or consumer electronic (CE) devices such as set-top boxes, smartphones, etc., may implement the techniques and/or arrangements described herein. Further, while the following description may set forth numerous specific details such as logic implementations, types and interrelationships of system components, logic partitioning/integration choices, etc., claimed subject matter may be practiced without such specific details. Furthermore, some material such as, for example, control structures and full software instruction sequences, may not be shown in detail in order not to obscure the material disclosed herein.

Certain portions of the material disclosed herein may be implemented in hardware, for example as logic circuitry in an image processor. Certain other portions may be implemented in hardware, firmware, software, or any combination thereof. At least some of the material disclosed herein may also be implemented as instructions stored on a machine-readable medium, which may be read and executed by one or more processors (graphics processors and/or central processors). A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical, or other similarly non-transitory, tangible media.

One or more system, apparatus, method, and computer readable media is described below for determining point-to-point distances from 3D image data. In some embodiments, two measure points, for example specified by a user, represent endpoints on an object of interest within the image frame. Assuming all points lying between these endpoints also belong to the object of interest, additional 3D data associated with points that lie along a measurement line defined by the measure points may be leveraged according to embodiments described herein to provide a robust distance measurement.

FIG. 1 is a schematic of point-to-point distance measurements in 3D camera images, in accordance with some embodiments. In the illustrated embodiment, a camera platform includes an array camera 115. In some embodiments, array camera 115 is a component of a mobile computing device having a plurality of camera hardware modules (CM) 110, 111, and 112 with a predetermined baseline relationship, Although in the exemplary embodiments three camera hardware modules are illustrated, any number of camera hardware modules and/or image sensors may be included in an array camera.

Each of the plurality of camera modules 110, 111, 112 may collect an input image captured from a different camera viewpoint. In exemplary embodiments, the images captured of the world scene 101 from different viewpoints are captured at substantially the same instant of time such that they contain image data for a given scene. One of the three image frames may be designated as a reference, and combined with information from the other frames into an image frame 120 having depth or range (z) information, or disparity information indicative of depth, for each 2D (x,y) spatial position within the image frame. For example, where CM 110 has a higher resolution (e.g., 8 megapixel, or more) than camera modules 111, 112 (e.g., 720p, HD, etc.), CM 110 may provide a default reference RGB image. CM 111 and CM 112 may be considered supplemental to the reference module and are each associated with predetermined baseline vector (length and direction) from camera module 110 to generate depth data (D). The input image may then be associated with RGB-D data for each 2D spatial position with the input image frame. In an exemplary embodiment where camera modules 110, 111, and 112 are on a mobile platform, the baseline vector between the reference camera module and each supplemental camera module may have a length of tens of millimeters to tens of centimeters, depending on the form factor. In other embodiments, where camera modules 110, 111, 112 are separate infrastructure fixtures, baseline lengths may be on the order of meters. In one exemplary mobile device embodiment, camera modules 111, 112 are spaced by a known distance on opposite sides of reference camera module 110.

As further illustrated in FIG. 1, input image frame 120 includes objects 140 and 150. Measure points 130A and 130B are received, for example through user input. The user's goal in such a situation may be to determine the real world physical width of object 140 from input image frame 120. As such, the measure point inputs 130A and 130B are employed as endpoints of a measurement line 130 extending across object 140. As a further illustration, measure points 135A and 135B are also received, for example through a second user input. The user's goal in this second situation may be to determine the real world physical width of a gap or space between measure points 135A and 135B. As such, the second measure point inputs 135A and 135B are again employed as endpoints of a measurement line 135 extending between object 140 and object 150. In the first example, it is helpful to employ input image data along the entire length of measurement line 130 under the assumption that measure points 130A, 130B lie along edges of an object such that the entire measurement line 130 is spanning the object 140 to be measured. Such an assumption is based on the logic that a user often desires measurement data for a single object at a time. In some embodiments described herein, a refinement of the 3D spatial coordinates corresponding to measure points 130A and 130B is performed based on additional information obtained by analyzing the 3D structure of a plurality of points along the measurement line.

In the second example however, it may not be helpful to employ input image data from the entire length of measurement line 135 because it is a gap measurement and many different background objects may be present within the gap, each associated with a different depth value. Therefore, in some further embodiments herein, measure points 135A, 135B are not refined based on additional information obtained by analyzing the 3D structure of a plurality of points along the measurement line.

Figure 2A:
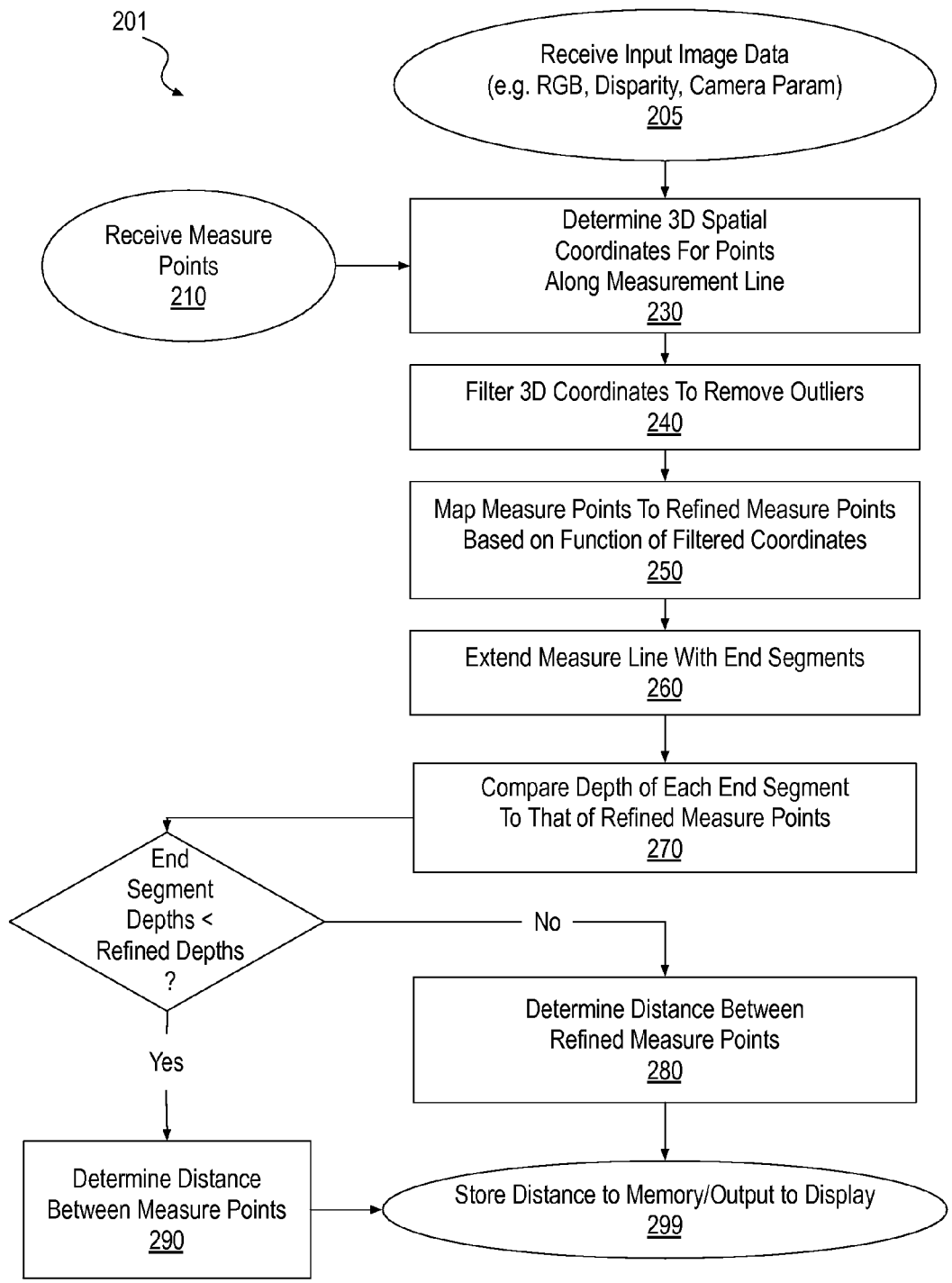
FIG. 2A is a flow diagram of a method for point-to-point distance measurement, in accordance with some embodiments.

FIG. 2A is a flow diagram of a method 201 for determining point-to-point distances from 3D image data. In exemplary embodiments, method 201 is implemented by one or more computer processors, for example integrated into a 3D camera platform as described further below. Method 201 begins with receiving input image data associated with an image frame at operation 205. The input image data is 3D image data including depth information, in addition to color information (e.g., intensity for each of a plurality of color channels in any color space, such as RGB, $YP_BP_R$, $YC_BC_R$, or the like). There may be a depth or disparity value associated with each pixel of an image frame, or some depth/disparity values may be absent in the event of a camera occlusion and/or textureless surface, etc. Even where a depth value is associated with each pixel of an input image frame, the depth data is expected to be noisy as a result of upstream image processing employed to determine the depth values.

In some embodiments, depth information received at operation 205 is in the form of a depth map correlated with a plurality of pixels $p_i$, each having an image coordinate $x_i$, $y_i$ associated with the input image frame. In other embodiments, the depth information received at operation 205 is in the form of a disparity map correlated with a plurality of pixels, each having an image coordinate $x_i$, $y_i$ associated with the input image. A disparity value associated with a pixel indicates the correspondence of the pixel in one image (e.g., collected by camera module 110 in FIG. 1) to a pixel in another image (e.g., collected by camera module 111). The disparity estimation may be by any technique, as embodiments herein are not limited in this respect.

For some embodiments where a 3D (X,Y,Z) spatial coordinate map is not received as an input at operation 205, a "world 3D coordinate" map of the image data is generated at operation 205. Any mapping functions may be utilized to determine 3D spatial coordinates from a disparity value at the corresponding pixel position, for example based on predetermined camera parameters received at operation 205. For each image point p=(x,y), there is associated range information Z=R(x,y) that is a projection of the 3D point P given by:

$$P = \begin{bmatrix} X \\ Y \\ Z \end{bmatrix} = K^{-1} \begin{bmatrix} x \\ y \\ z \end{bmatrix}, \quad (1)$$

where the projection matrix K is associated with intrinsic camera calibration information. For many consumer digital cameras with spherical lensing, $f_x=f_y$ and skew s=0, and the projection matrix simplifies to:

$$K = \begin{bmatrix} f_x & s & c_x \\ 0 & f_y & c_y \\ 0 & 0 & 1 \end{bmatrix}, \quad (2)$$

where $c_x$, $c_y$ denotes the principal point.

At operation 210, measure points associated with the input image frame are received. In exemplary embodiments, measure points are received as pairs: $p_1$ and $p_2$. As one example, a user selection of two measure points $p_1$, $p_2$ may be received from a touch input sampled by a touch display presenting the input image frame to the user. With $p_1=(x_1,y_1)$ and $p_2=(x_2,y_2)$, each measure point $p_1$ and $p_2$ is associated with a 3D spatial coordinate $P_1$, and $P_2$, respectively, as determined from Eq. (1) and Eq. (2).

At operation 230, a set of 3D spatial coordinates is similarly determined for pixel positions along a measurement line defined by the measure points $p_1$, $p_2$. Image pixel positions along the measurement line may be sampled at the closest integer coordinates in the image frame. In some embodiments, to maximize the number of sampling points, the 3D image data is sampled along the x-dimension if $|p_1(x)-p_2(x)|>|p_1(y)-p_2(y)|$, and along the y-dimension otherwise. Depending on the method employed to compute depth, 3D coordinates can be obtained for all or a subset of points along the measurement line. In some embodiments, the set points $\{L_i\}$ on the measurement line are stored to an electronic memory, where $L_i=X_i$, $Y_i$, $Z_i$, and i=1, 2, ... N. Any missing depth values are not included in set of measurement line points $\{L_i\}$.

At operation 240, the set of measurement line points $\{L_i\}$ are filtered to account for outliers. In exemplary embodiments, the filter operation 240 is based on the logic that many real world objects a user might measure have a profile that is linear along the measurement axis. Thus many objects, if not too close to the camera, will have a planar character. For example, 3D points on a human often appear planar in many depth measurements. This is also true with many commonly occurring polygonal objects in the world such as buildings, furniture, cars, photographs, etc. In some embodiments, the filtering operation 240 employs this assumption to enhance the accuracy of the measurement between measure points $p_1$, $p_2$ by finding linear structure(s) in the set of measurement line points $\{L_i\}$. A subset of the set of measurement line points $\{L_i\}$ having inadequate linear structure is removed, ignored, or otherwise discounted as containing outliers.

At operation 250, the 3D coordinates for the measure points ($P_1$, $P_2$) are then mapped to 3D coordinates associated with predicted, or "refined" measurement points ($P_1'$, $P_2'$), respectively. The refinement is based on a function derived from the measurement line points having sufficient linear structure. This measurement line function may be employed to determine the predicted measure point coordinates $P_1'$, $P_2'$. In some embodiments, the predicted measure point coordinates $P_1'$, $P_2'$ are employed to determine whether the measurement line is associated with a point-to-point gap measurement rather than a point-to-point object measurement. Where input measure points $p_1$, $p_2$ span a gap between different objects, such as the distance between of a doorway as illustrated in FIG. 1, refinement by filtering on the basis of linearity over the measurement line may not hold significant advantages. Method 201 therefore further illustrates some embodiments that employ gap measurement detection. Use of the predicted measure point coordinates $P_1'$, $P_2'$ may then be conditioned upon an outcome of the gap detection algorithm. In response to detecting a gap, the point-to-point distance measure may be determined independent of predicted measure point coordinates $P_1'$, $P_2'$. In the absence of detecting a gap, the point-to-point distance measure may be determined based on predicted measure point coordinates $P_1'$, $P_2'$.

Figure 2B:
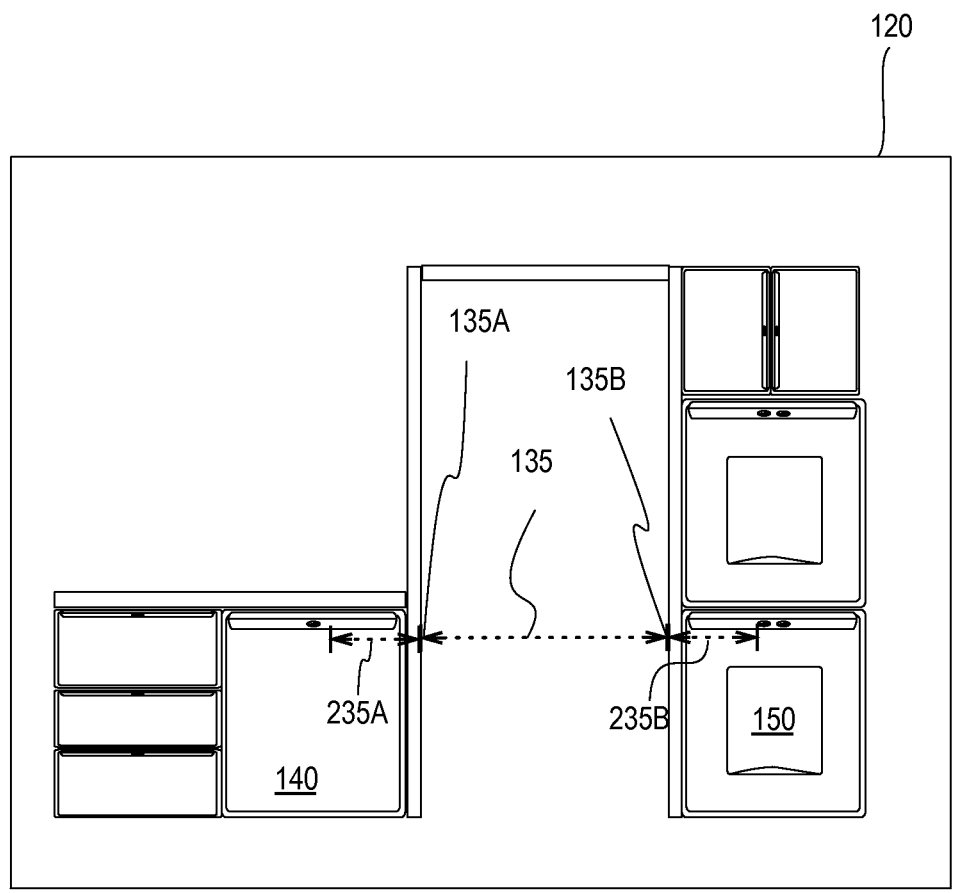
FIG. 2B is a schematic of a point-to-point gap distance measurement in 3D camera images, in accordance with some embodiments.

In the exemplary embodiment, at operation 260 the measurement line $P_1P_2$ is extended by end segments of a predetermined, fixed length. FIG. 2B is a schematic of a point-to-point gap distance measurement, illustrating a first end segment 235A extending away from $P_1$ (135A) along measurement line $P_1P_2$ (135), and a second end segment 235B extending away from $P_2$ (135B) along measurement line $P_1P_2$ (135). At operation 270, a depth associated with each of the end segments is compared to the nearest predicted measure point depth Z'. In advantageous embodiments, a robust estimate of a first end segment depth $Z_1^{ext}$ is determined from the depth values in the first end segment. As one example, a biweight or bisquare function may be employed to estimate depth $Z_1^{ext}$. The same technique may be applied to arrive at an estimate of the second end segment depth $Z_2^{ext}$.

Method 201 then proceeds to either operation 280 or 290 in response to the outcome of the comparison between $Z_1'$ and $Z_1^{ext}$ and the comparison between $Z_2'$ and $Z_2^{ext}$. In response to at least one of the end segments having an equal or greater depth than that of the nearest predicted measure point depth Z', method 201 proceeds to operation 280 where a point-to-point object distance measurement is determined based on the predicted measure point coordinates $P_1'$, $P_2'$. Although any known technique may be employed at operation 280, in some exemplary embodiments, the Euclidean distance between predicted measure point coordinates $P_1'$, $P_2'$ is computed as:

$$d = \|P'_1 - P'_2\|_2 = \sqrt{(X_1 - X_2)^2 + (Y_1 - Y_2)^2 + (Z_1 - Z_2)^2}. \quad (3)$$

The measured distance d computed based on the predicted measure points is of improved accuracy, removing error from user input of measure points $p_1$, $p_2$ that might be obtained through a pointer or touch interface. Often, in the case of measure points $p_1$, $p_2$ being specified for measurement of an object of interest, points on foreground or background regions adjoining the object may be inadvertently included. 3D coordinate data filtered for linearity will remove such errors.

In response to both the end segments having less depth than that of the nearest predicted measure point depth Z' (i.e., $Z_1^{ext} < Z_1'$ AND $Z_2^{ext} < Z_2'$), a gap measurement is detected. Method 201 then proceeds to operation 290 where a point-to-point gap distance measurement is determined based on the measure point coordinates $P_1$, $P_2$. Although any known technique may be employed at operation 290, in some exemplary embodiments, the Euclidean distance between measure point coordinates $P_1$, $P_2$ is computed as described above for the predicted measure point coordinates $P_1'$, $P_2'$.

Method 201 is then complete upon storing and/or outputting the distance d as a point-to-point measurement at operation 299. Distance d may be stored as metadata associated with the input measure points $p_1$, $p_2$, and/or as metadata associated with the input image. In some embodiments, the distance d is stored to an electronic memory in association with the measure points $p_1$, $p_2$ received at operation 210. In some other embodiments, the distance d is stored to an electronic memory in association with the input image received at operation 205. In still other embodiments, the distance d is stored to an electronic memory in association with the measure points $p_1$, $p_2$, and in association with the input image received at operation 205.

Figure 3:
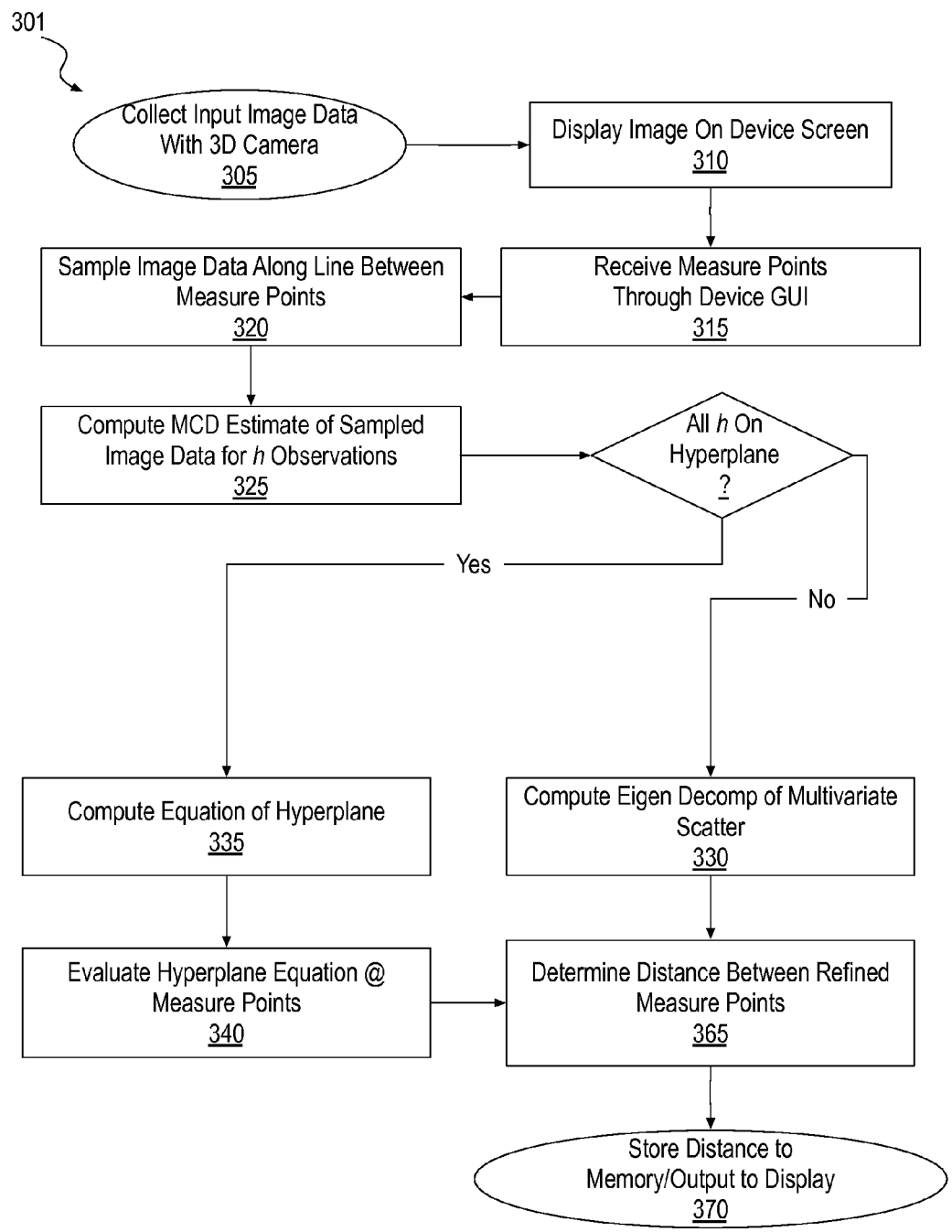
FIG. 3 is a flow diagram of a method for point-to-point distance measurement, in accordance with some embodiments.

In some embodiments, a robust total least square (TLS) fitting of the 3D coordinates in the measurement line set $\{L_i\}$ is performed to account for outliers, for example at operation 240 above, and to arrive at the predicted measure point coordinates $P_1'$, $P_2'$. Such a technique, or the equivalent, is appropriate because the variables along all 3 directions (X,Y,Z) may suffer from significant error. FIG. 3 is a flow diagram of a method 301 for point-to-point distance measurement, in accordance with some exemplary embodiments. Method 301 further illustrates an exemplary embodiment of method 201.

Method 301 begins with collecting input image data with a 3D camera module at operation 305. In some embodiments, the 3D camera module is the array camera 115 (FIG. 1) introduced above. In other embodiments, the input image data is collected with a time of flight (TOF) camera. In still other embodiments, a structured light source (illuminator) is employed at operation 305 to determine a depth data map over the input image frame. Other known 3D cameras and depth mapping techniques may also be employed at operation 305 to collect 3D data for an input image frame.

At operation 310, the input image frame collected at operation 305 is presented on a display screen. In some exemplary embodiments, the input image frame is presented on a display screen integrated into a same platform as the 3D camera, such as, but not limited to a mobile device platform. At operation 315, measure points $p_1$, $p_2$ are received through a graphical user interface (GUI) implemented by the 3D camera platform. For example, in some embodiments, user touches are received at operation 315 while the display screen is presenting of the input image at operation 310.

At operation 320, 3D spatial coordinate data is sampled along a measurement line extending between the two measure points. From this sampling, the set of measurement line points $\{L_i\}$ is generated, as described above.

In some embodiments, TLS fitting is performed through Principal Component Analysis (PCA) to identify linear structures within $\{L_i\}$. However, traditional PCA is sensitive to outliers in the data and therefore is not well-suited to a measurement problem where outliers in the depth data are commonly observed. Robust PCA (RPCA) is therefore advantageous. At operation 325 therefore, a robust estimate of the covariance matrix is computed to address the difficulty posed by outliers. In some exemplary embodiments, the minimum covariance determinant (MCD) estimator of the covariance matrix of the data is computed. MCD provides a highly robust estimate of multivariate location T and multivariate scatter S. The objective of the MCD algorithm is to find h observations out of N included in the measurement line set $\{L_i\}$ whose covariance matrix has the lowest determinant. While any known MCD algorithm may be employed at operation 325, in some embodiments the Fast MCD algorithm is employed to generate the MCD solution.

The parameter h, which determines the breakdown point of the Fast MCD estimator may be predetermined for a given camera platform. Different depth measurement systems have different accuracies and these may be considered in selecting h, which directly corresponds to the expected number of outliers for the system. In some exemplary embodiments where a disparity estimation is determined with a three camera system, h might be 0.5N, or less. For larger array camera systems, h may be increased with expected improvements in disparity accuracy. This is also true of structured light or time-of-flight systems that use active illumination to more accurately measure depth.

The Fast MCD algorithm advantageously allows for exact fit situations where h or more observations lie on a hyperplane, while also yielding robust estimates of location and scatter (which is singular when h or more observations lie on a hyperplane). In response to non-singular scatter, method 301 proceeds to operation 330 where an Eigen decomposition of the multivariate scatter S is performed as $S=V\Lambda^T$ to compute the principal components of the data. The first principal component, which is the Eigen vector corresponding to the largest Eigen value, may be denoted $v_0$. At operation 345, $P_1$ and $P_2$ are projected onto the principal component $v_0$ to obtain the projected coordinates $P_1'$ and $P_2'$, as:

$$P'_1 = T + [(P_1 - T) \cdot v_0] v_0, \quad (4)$$

$$P'_2 = T + [(P_2 - T) \cdot v_0] v_0. \quad (5)$$

If instead, all points fall on the hyperplane, method 335 proceeds to operation 335 where an equation of the hyperplane is computed. In exemplary embodiments the Fast MCD algorithm is further employed at operation 335 compute the hyperplane equation $aX+bY+cZ+d=0$. At operation 340 the hyperplane equation is evaluated at measure point coordinates $P_1$, $P_2$. If a; b=0, the object being measured has a single depth measurement and that the hyperplane simplifies to $$Z = -\frac{d}{c}.$$

The X coordinate of $P_1$ and $P_2$ is then set to $$-\frac{d}{c}$$

and the refined points $P_1'$, $P_2'$ are re-computed using this predicted depth measurement in Equation (1). In response to either a or b not equaling 0, the measure point coordinates $P_1$ and $P_2$ are projected onto a line to compute the predicted measure point coordinates $P_1'$ and $P_2'$, as given below for $P_1'$:

$$t_1 = \frac{-aX_1 - bY_1 - cZ_1 - d}{a^2 + b^2 + c^2}, \quad (6)$$

$$P'_1 = \begin{bmatrix} at_1 + X_1 \\ bt_1 + Y_1 \\ ct_1 + Z_1 \end{bmatrix} \quad (7)$$

With the predicted measure point coordinates $P_1'$ and $P_2'$ determined, method 301 continues at operation 365 wherein the distance between the predicted measure points is determined. In some embodiments, for example by applying Equation (3). Method 301 is completed with storing the distance d to an electronic memory as the point-to-point distance for the input measure points received at operation 315. The distance d may be stored in association with either or both the input image and input measure points. The distance d may further be output to a display screen of the camera device or otherwise presented or transmitted to a user.

Figure 4:
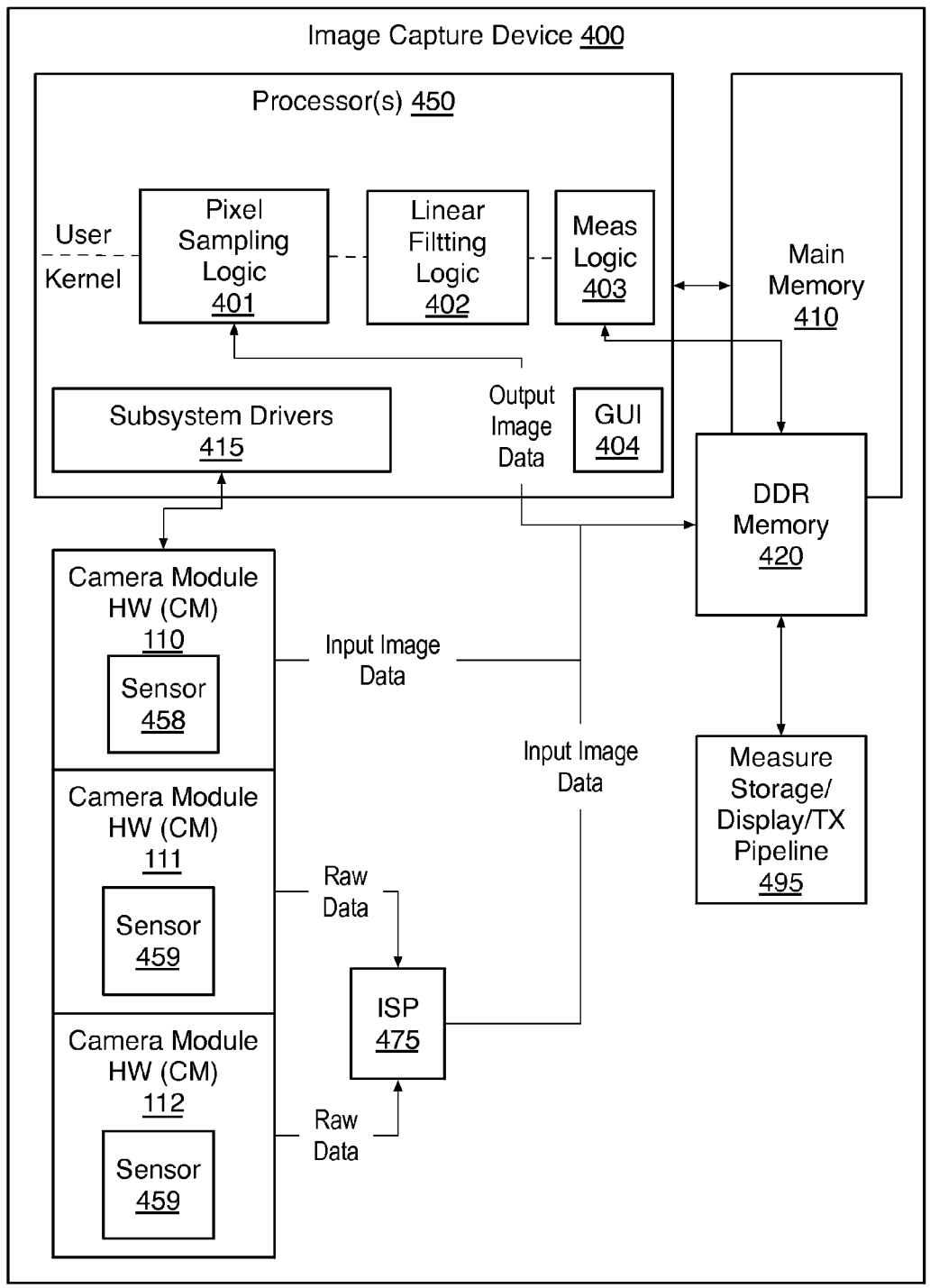
FIG. 4 illustrates an image capture device including a point-to-point distance measurement pipeline, in accordance with some embodiments.

FIG. 4 further illustrates how a point-to-point measurement device may be integrated with various other components of an image and/or video capture device 400 to provide enhanced camera output suitable for point-to-point measurement determinations. Image capture device 400 for example may be a portion of a mobile computing device platform. A mobile computing device may refer to any device having a processing system and a mobile power source or supply, such as one or more batteries, for example. Examples of a mobile computing device may include a laptop computer, tablet, touch pad, portable computer, handheld computer, palmtop computer, personal digital assistant (PDA), cellular telephone, combination cellular telephone/PDA, television, smart device (e.g., smartphone, tablet or smart television), mobile internet device (MID), messaging device, data communication device, and so forth. Examples of a mobile computing device also include computers and/or media capture/transmission devices configured to be worn by a person, such as a wrist computer, finger computer, ring computer, eyeglass computer, belt-clip computer, arm-band computer, shoe computers, clothing computers, and other wearable computers. In various embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

Image capture device 400 includes hardware camera modules 110, 111, and 112. In the exemplary embodiment, CM 110 further includes a RGB(NIR) camera sensor 458 while CM 111 and 112 each include a RGB(NIR) camera sensor 459. Sensor 458 may be a HD, FHD, QXGA, WQXGA, QSXGA, or UHD format digital image device, for example. In some embodiments, sensor 458 has at least 8-megapixel resolution. Sensors 459 may be a HD, FHD, QXGA, WQXGA, QSXGA, or UHD format digital image device, for example. In some embodiments, sensors 459 have a lower pixel resolution than sensor 458, for example 1-5 mega pixel. Image/video capture device 400 may therefore generate three image frames concurrently, for example to provide both RGB image data and image depth data for an input image.

Camera sensors 458, 459 may provide a color resolution of 8 bits, or more per pixel, and be operable to capture continuous video frames progressively. Sensor 458 may have a pixel frequency of 170 MHz, or more. Sensors 458, 459 may include an RGB Bayer color filter, an analog amplifier, an A/D converter, other components to convert incident light into a digital signal corresponding to raw image data. Sensors 458, 459 may be controlled to operate a rolling shutter or electronic focal plane shutter process where pixels are read out progressively in a line-sequential fashion for a frame. CM 110, 111, and 112 may each output raw data associated with consecutively exposed frames in conformance with any known streaming protocol, such as a MIPI.

In the exemplary embodiment, raw image/video data output by CM 111 and 112 is input to ISP 475. ISP 475 is to receive and analyze frames of raw video data during the horizontal and/or vertical blanking periods associated with CM 111 and 112. During raw image data processing of RGB image data, ISP 475 may perform one or more of color space conversion, noise reduction, pixel linearization, and shading compensation, for example. In some embodiments, raw image data is passed through ISP 475 to be processed downstream by a programmable microprocessor 450.

Image data output by ISP 475 may be buffered and queued as input image data ready for further image processing, such as point-to-point 3D image measurement, for example in accordance with one or more of the embodiments described elsewhere herein. In embodiments, processor(s) 450 includes logic to perform point-to-point measurement operations and execute algorithms described elsewhere herein. In embodiments, processor(s) 450 includes logic to perform the point-to-point measurement operations and execute algorithms described elsewhere herein. In some embodiments, processor(s) 450 includes logic to perform one or more of the operations of method 201 (FIG. 2) and/or method 301 (FIG. 3). In some embodiments, processor(s) 450 includes pixel sampling logic 401 to determine 3D spatial coordinates for points along a measurement line define by two endpoint inputs. In some embodiments, pixel sampling logic 401 is implemented with programmable circuitry including registers that have been configured through software instruction(s). In some embodiments, processor(s) 450 includes 3D coordinate linear fitting logic 402 to implement a robust technique for identifying linear structure within the sampled set of 3D coordinates, for example with and RPCA and/or MCD algorithms, as described elsewhere herein. In some embodiments, 3D coordinate linear fitting logic 402 is implemented with programmable circuitry including registers that have been configured through software instruction(s). In some embodiments, processor(s) 450 includes measurement logic 403 to determine a point-to-point distance between predicted measure point coordinates, for example as described elsewhere herein. In some embodiments, measurement logic 403 is implemented with programmable circuitry including registers that have been configured through software instruction(s).

Both software and hardware implementations may be well suited to implementing point-to-point measurements in accordance with embodiments described herein. For hardware implementations, pixel sampling logic 401, and/or 3D coordinate linear fitting logic 402, and/or measurement logic 403 may be implemented by fixed function logic, for example provided by ISP 475. For software implementations, any known programmable processor, including a core of processor(s) 450, an execution unit of a graphics processor, or vector processor, may be utilized to implement the pixel sampling logic 401 and/or 3D coordinate linear fitting logic 402, and/or measurement logic 403. Processor(s) 450 may be solely responsible for generating point-to-point measurement data from input image data received from ISP 475. In one exemplary embodiment, pixel sampling logic 401 and/or 3D coordinate linear fitting logic 402, and/or measurement logic 403 are invoked through the user space of a software stack instantiated by processor(s) 450. In some embodiments, processor(s) 450 executes pixel sampling logic 401, and/or 3D coordinate linear fitting logic 402, and/or measurement logic 403 instantiated in a kernel space of the software stack. In some embodiments, processor(s) 450 is programmed with instructions stored on a computer readable media to cause the processor to perform one or more of pixel sampling along a measurement line, pixel filtering based on linear structure, or distance determination based on predicted measure point coordinates, for example as described elsewhere herein.

As further illustrated in FIG. 4, point-to-point measurement data may be output to storage/display/transmission pipeline 495. In one exemplary storage pipeline embodiment, point-to-point measurement data is written to electronic memory 420 (e.g., DDR, etc.) to supplement stored input image data. Memory 420 may be separate or a part of a main memory 410 accessible to processor 450. Alternatively, or in addition, storage/display/transmission pipeline 495 is to transmit point-to-point measurement data and/or input image data off video/image capture device 400.

Figure 5:
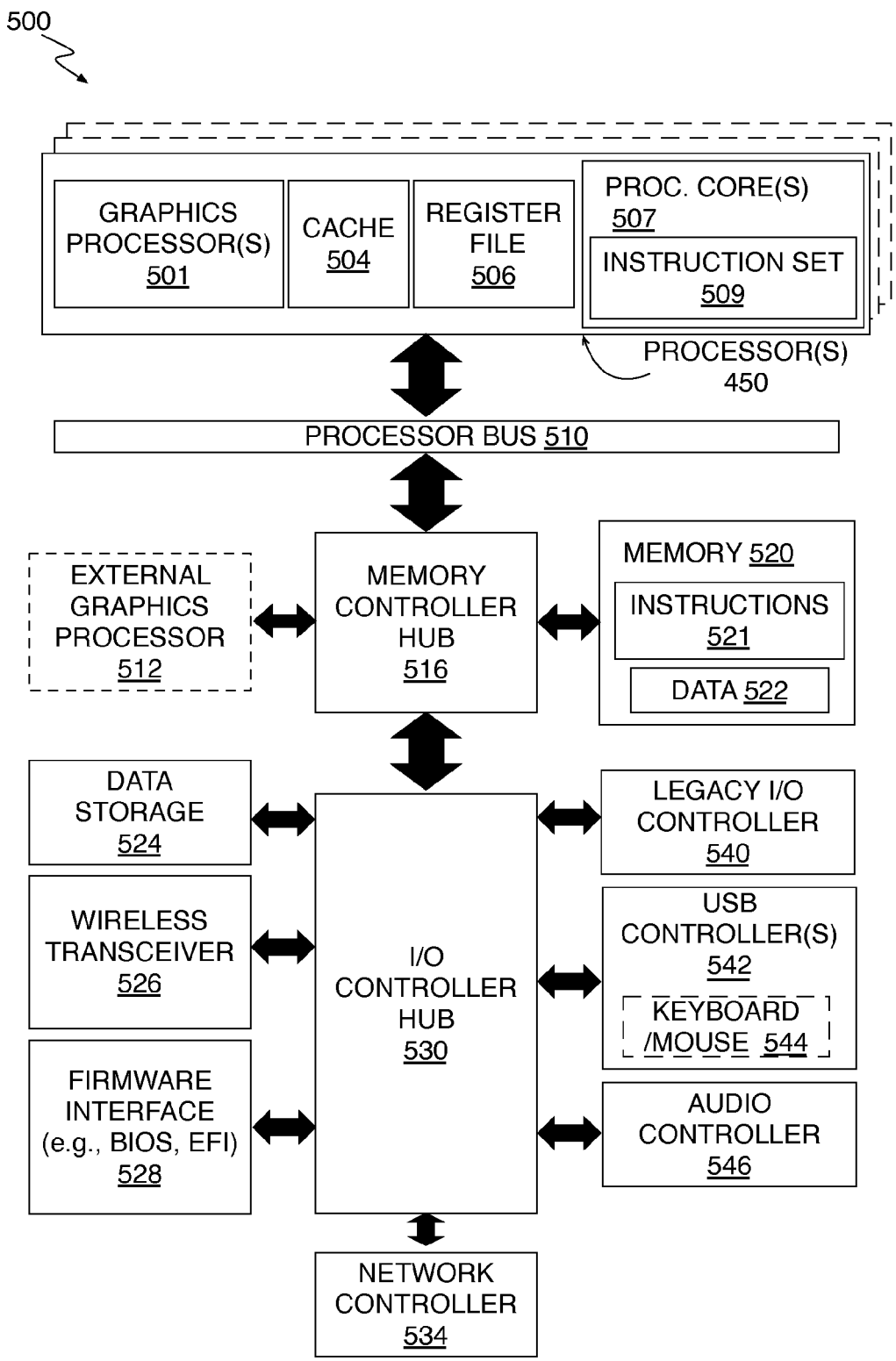
FIG. 5 is a block diagram of an embodiment of a processor having one or more processor cores, an integrated memory controller, and an integrated graphics processor, according to some embodiments.

FIG. 5 block diagrams a data processing system 500 that may be utilized to processing an input image to determine a point-to-point measurement distance. Data processing system 500 includes one or more processors 450 and one or more graphics processors 501, and may be implemented in a single processor desktop system, a multiprocessor workstation system, or a server system having a large number of processors 450 or processor cores 507. In another embodiment, the data processing system 500 is a system-on-a-chip (SoC) integrated circuit for use in mobile, handheld, or embedded devices.

An embodiment of data processing system 500 can include, or be incorporated within a server-based gaming platform, a game console, including a game and media console, a mobile gaming console, a handheld game console, or an online game console. In some embodiments, data processing system 500 is a mobile phone, smart phone, tablet computing device or mobile Internet device. Data processing system 500 can also include, couple with, or be integrated within a wearable device, such as a smart watch wearable device, smart eyewear device, augmented reality device, or virtual reality device. In some embodiments, data processing system 500 is a television or set top box device having one or more processors 502 and a graphical interface generated by one or more graphics processors 508.

In some embodiments, the one or more processors 502 each include one or more processor cores 507 to process instructions which, when executed, perform operations for system and user software. In some embodiments, each of the one or more processor cores 507 is configured to process a specific instruction set 509. In some embodiments, instruction set 509 may facilitate Complex Instruction Set Computing (CISC), Reduced Instruction Set Computing (RISC), or computing via a Very Long Instruction Word (VLIW). Multiple processor cores 507 may each process a different instruction set 509, which may include instructions to facilitate the emulation of other instruction sets. Processor core 507 may also include other processing devices, such a Digital Signal Processor (DSP).

In some embodiments, the processor 502 includes cache memory 504. Depending on the architecture, the processor 502 can have a single internal cache or multiple levels of internal cache. In some embodiments, the cache memory is shared among various components of the processor 502. In some embodiments, the processor 502 also uses an external cache (e.g., a Level-3 (L3) cache or Last Level Cache (LLC)) (not shown), which may be shared among processor cores 507 using known cache coherency techniques. A register file 506 is additionally included in processor 502 which may include different types of registers for storing different types of data (e.g., integer registers, floating point registers, status registers, and an instruction pointer register). Some registers may be general-purpose registers, while other registers may be specific to the design of the processor 502.

In some embodiments, processor 502 is coupled to a processor bus 510 to transmit data signals between processor 502 and other components in system 500. System 500 has a 'hub' system architecture, including a memory controller hub 516 and an input output (I/O) controller hub 530. Memory controller hub 516 facilitates communication between a memory device and other components of system 500, while I/O Controller Hub (ICH) 530 provides connections to I/O devices via a local I/O bus.

Memory device 520 can be a dynamic random access memory (DRAM) device, a static random access memory (SRAM) device, flash memory device, or some other memory device having suitable performance to serve as process memory. Memory 520 can store data 522 and instructions 521 for use when processor 502 executes a process. Memory controller hub 516 also couples with an optional external graphics processor 512, which may communicate with the one or more graphics processors 508 in processors 502 to perform graphics and media operations.

In some embodiments, ICH 530 enables peripherals to connect to memory 520 and processor 502 via a high-speed I/O bus. The I/O peripherals include an audio controller 546, a firmware interface 528, a wireless transceiver 526 (e.g., Wi-Fi, Bluetooth), a data storage device 524 (e.g., hard disk drive, flash memory, etc.), and a legacy I/O controller for coupling legacy (e.g., Personal System 2 (PS/2)) devices to the system. One or more Universal Serial Bus (USB) controllers 542 connect input devices, such as keyboard and mouse 544 combinations. A network controller 534 may also couple to ICH 530. In some embodiments, a high-performance network controller (not shown) couples to processor bus 510.

Figure 6:
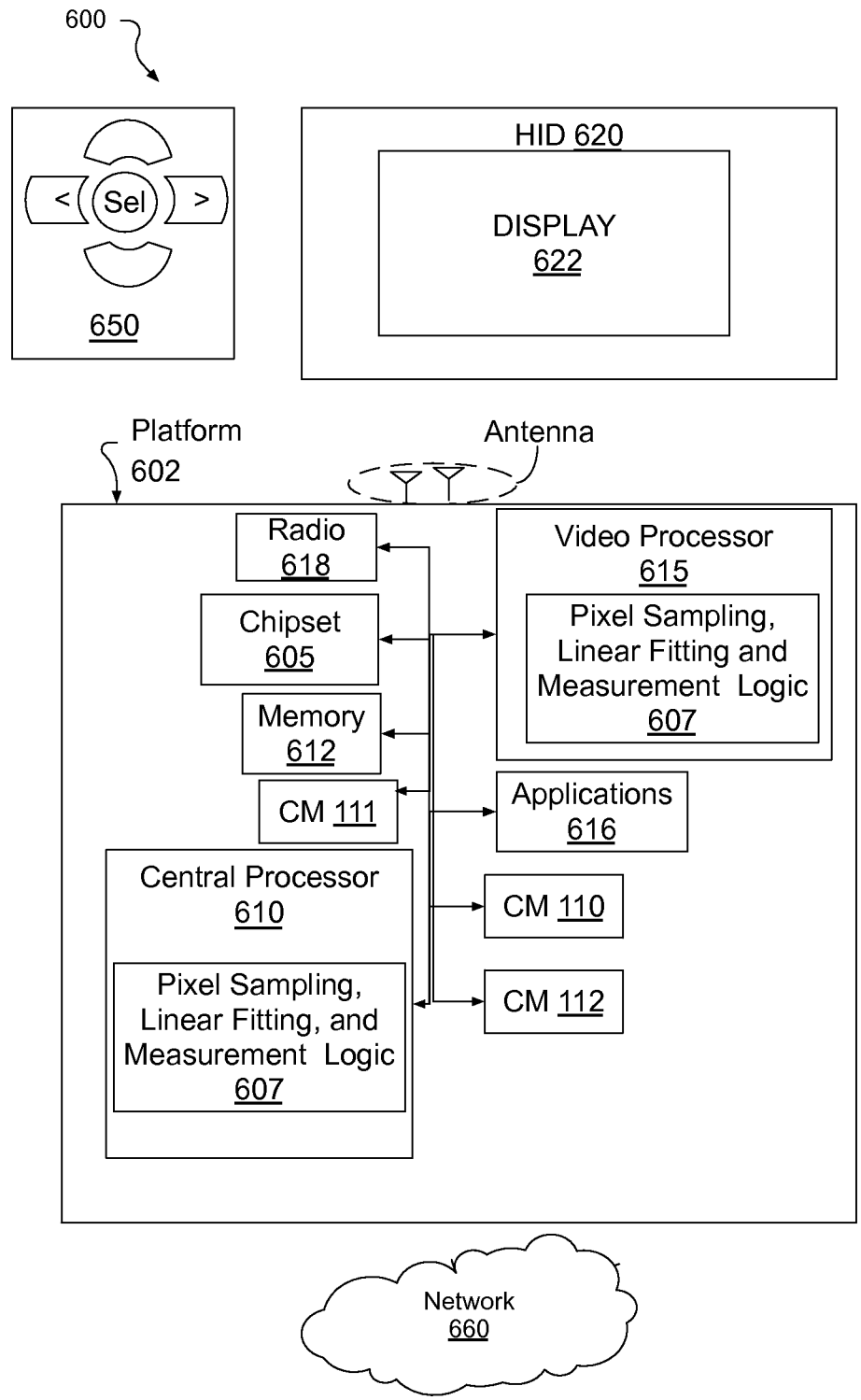
FIG. 6 is a diagram of an exemplary ultra-low power system employing a point-to-point measurement device, in accordance with some embodiments.

FIG. 6 is a diagram of an exemplary ultra-low power system 600 employing a point-to-point measurement device, in accordance with one or more embodiment. System 600 may be a mobile device although system 600 is not limited to this context. System 600 may be incorporated into a wearable computing device, laptop computer, tablet, touch pad, handheld computer, palmtop computer, cellular telephone, smart device (e.g., smart phone, smart tablet or mobile television), mobile internet device (MID), messaging device, data communication device, and so forth. System 600 may also be an infrastructure device. For example, system 700 may be incorporated into a large format television, set-top box, desktop computer, or other home or commercial network device.

System 600 includes a device platform 602 that may implement all or a subset of the various point-to-point measurement methods and any of the logic blocks/circuitry described above in the context of FIG. 2-FIG. 5. In various exemplary embodiments, video processor 615 executes at least one of pixel sampling, robust linear fitting, and distance measurement logic, for example as described above. Video processor 615 includes logic circuitry 607 implementing point-to-point measurement based on 3D data from an input image, for example as described elsewhere herein. In some embodiments, one or more computer readable media may store instructions, which when executed by CPU 610 and/or video processor 615, cause the processor(s) to execute one or more point-to-point measurement method, such as any of those described in detail above. A point-to-point measurement may then be stored in memory 612.

In embodiments, device platform 602 is coupled to a human interface device (HID) 620. Platform 602 may collect raw image data with CM 110, 111, 112, which is processed and output to HID 620. A navigation controller 650 including one or more navigation features may be used to interact with, for example, device platform 602 and/or HID 620. In embodiments, HID 620 may include any television type monitor or display coupled to platform 602 via radio 618 and/or network 660. HID 620 may include, for example, a computer display screen, touch screen display, video monitor, television-like device, and/or a television to receive touch inputs while an input image is displayed on display 622.

In embodiments, device platform 602 may include any combination of CM 110-112, chipset 605, processors 610, 615, memory/storage 612, applications 616, and/or radio 618. Chipset 605 may provide intercommunication among processors 610, 615, memory 612, video processor 615, applications 616, or radio 618.

One or more of processors 610, 615 may be implemented as one or more Complex Instruction Set Computer (CISC) or Reduced Instruction Set Computer (RISC) processors; x86 instruction set compatible processors, multi-core, or any other microprocessor or central processing unit (CPU).

Memory 612 may be implemented as a volatile memory device such as, but not limited to, a Random Access Memory (RAM), Dynamic Random Access Memory (DRAM), or Static RAM (SRAM). Memory 612 may also be implemented as a non-volatile storage device such as, but not limited to flash memory, battery backed-up SDRAM (synchronous DRAM), magnetic memory, phase change memory, and the like.

Radio 618 may include one or more radios capable of transmitting and receiving signals using various suitable wireless communications techniques. Such techniques may involve communications across one or more wireless networks. Example wireless networks include (but are not limited to) wireless local area networks (WLANs), wireless personal area networks (WPANs), wireless metropolitan area network (WMANs), cellular networks, and satellite networks. In communicating across such networks, radio 618 may operate in accordance with one or more applicable standards in any version.

In embodiments, system 600 may be implemented as a wireless system, a wired system, or a combination of both. When implemented as a wireless system, system 700 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 600 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and the like. Examples of wired communications media may include a wire, cable, metal leads, printed circuit board (PCB), backplane, switch fabric, semiconductor material, twisted-pair wire, co-axial cable, fiber optics, and so forth.

The thresholded pixel value matching and associated object processes comporting with exemplary embodiments described herein may be implemented in various hardware architectures, cell designs, or "IP cores."

Figure 7:
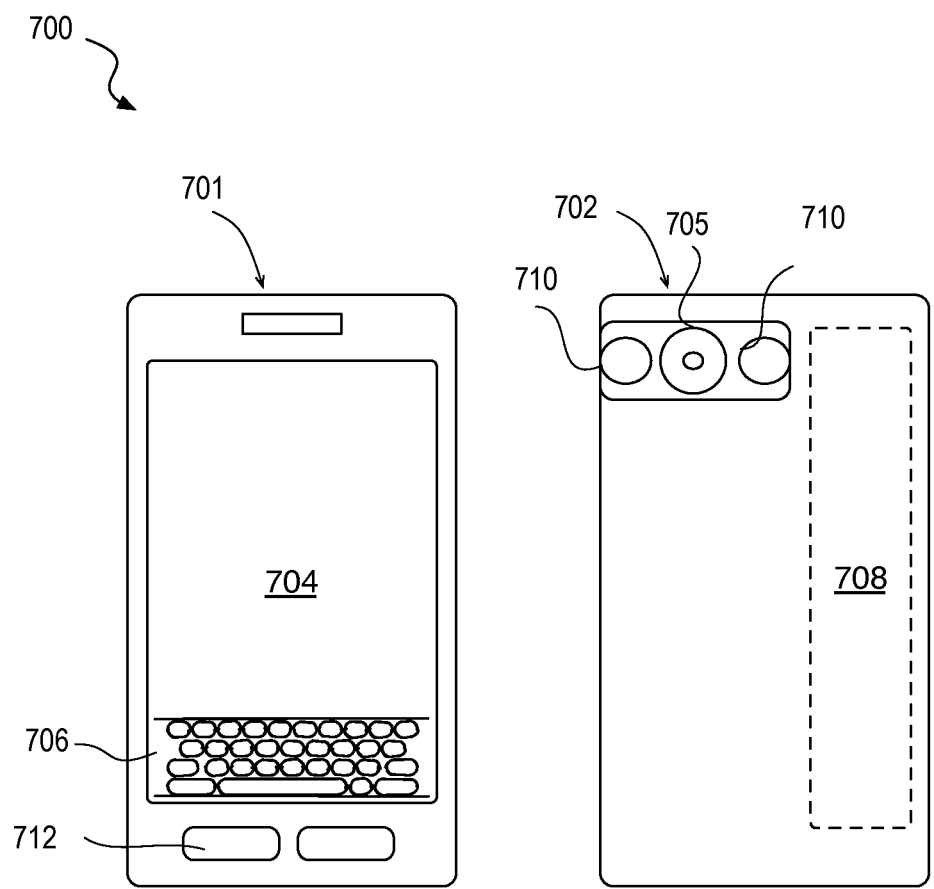
FIG. 7 is a diagram of an exemplary mobile handset platform, arranged in accordance with some embodiments.

As described above, system 600 may be embodied in varying physical styles or form factors. FIG. 7 further illustrates embodiments of a mobile handset device 700 in which system 600 may be embodied. In embodiments, for example, device 700 may be implemented as a mobile computing handset device having wireless capabilities. As shown in FIG. 7, mobile handset device 700 may include a housing with a front 701 and back 702. Device 700 includes a display 704, an input/output (I/O) device 706, and an integrated antenna 708. Device 700 also may include navigation features 712. Display 704 may include any suitable display unit for displaying information appropriate for a mobile computing device. I/O device 706 may include any suitable I/O device for entering information into a mobile computing device. Examples for I/O device 706 may include an alphanumeric keyboard, a numeric keypad, a touch pad, input keys, buttons, switches, microphones, speakers, voice recognition device and software, and so forth. Information also may be entered into device 700 by way of microphone (not shown), or may be digitized by a voice recognition device. Embodiments are not limited in this context. Integrated into at least the front 701, or back 702, are cameras 705, 710 (e.g., each including a lens, an aperture, and an imaging sensor), each of which may be components of one or more CM through which image data is exposed and output to the point-to-point measurement device as described elsewhere herein.

As exemplified above, embodiments described herein may be implemented using hardware elements, software elements, or a combination of both. Examples of hardware elements or modules include: processors, microprocessors, circuitry, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software elements or modules include: applications, computer programs, application programs, system programs, machine programs, operating system software, middleware, firmware, routines, subroutines, functions, methods, procedures, software interfaces, application programming interfaces (API), instruction sets, computing code, computer code, code segments, computer code segments, data words, values, symbols, or any combination thereof. Determining whether an embodiment is implemented using hardware elements and/or software elements may vary in accordance with any number of factors considered for the choice of design, such as, but not limited to: desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable storage medium. Such instructions may reside, completely or at least partially, within a main memory and/or within a processor during execution thereof by the machine, the main memory and the processor portions storing the instructions then also constituting a machine-readable storage media. Programmable logic circuitry may have registers, state machines, etc. configured by the processor implementing the computer readable media. Such logic circuitry, as programmed, may then be understood to be physically transformed into a system falling within the scope of the embodiments described herein. Instructions representing various logic within the processor, which when read by a machine may also cause the machine to fabricate logic adhering to the architectures described herein and/or to perform the techniques described herein. Such representations, known as cell designs, or IP cores, may be stored on a tangible, machine-readable medium and supplied to various customers or manufacturing facilities to load into the fabrication machines that actually make the logic or processor.

While certain features set forth herein have been described with reference to embodiments, this description is not intended to be construed in a limiting sense. Hence, various modifications of the implementations described herein, as well as other implementations, which are apparent to persons skilled in the art to which the present disclosure pertains are deemed to be within the spirit and scope of the present disclosure.

The following paragraphs briefly describe some exemplary embodiments:

In one or more first embodiments, a computer implemented method for point-to-point measurement of image data includes receiving an indication of a pair measurement points within an input image frame, determining a 3D spatial coordinate for each of a plurality of points along a measurement line defined by the pair of measurement points, filtering the 3D spatial coordinates associated with the measurement line to account for outliers, mapping the pair of measurement points to a pair of predicted points based on a function of the filtered 3D spatial coordinates, determining a distance between the pair of predicted points, and storing the distance to a memory in association with the pair of measurement points.

In furtherance of the first embodiments, filtering the 3D spatial coordinates further comprises fitting a linear structure to the 3D spatial coordinates. Mapping the pair of measurement points to the pair of predicted points is based on a function of the linear structure. Determining the distance between the pair of predicted points further comprises computing the Euclidean distance between the pair of predicted points.

In furtherance of the first embodiments immediately above, mapping the pair of measurement points to the pair of predicted points further comprises fitting a plane to the 3D spatial coordinates, and projecting the pair of measurement points onto the plane.

In furtherance of the first embodiments, fitting the linear structure comprises performing a robust total least squares (TLS) fit of the 3D spatial coordinates associated with the measurement line.

In furtherance of the first embodiments immediately above, performing the robust TLS fitting further comprises: determining a robust estimate of the multivariate location and scatter of the 3D spatial coordinates associated with the measurement line, and determining a principal component based on an Eigen decomposition of the scatter.

In furtherance of the first embodiments immediately above, determining the robust estimate of the multivariate location and scatter further comprises computing the minimum covariance determinant (MCD) estimator to find h observations of the 3D spatial coordinates associated with the measurement line associated with a covariance matrix having the lowest determinant. Mapping the pair of measurement points to the pair of predicted points further comprises determining if the h observations are all on a hyperplane, and computing the predicted points based on a predicted depth associated with the hyperplane in response to the h observations all being on the hyperplane, or projecting the measurement points onto a line in response to the h observations not all being on a hyperplane.

In furtherance of the first embodiments, the method further comprises constructing a pair of line segments, each extending the measurement line beyond one of the measurement points, determining a depth associated with each of the line segments, and determining the distance between the measurement points independent of the pair of refined points in response to both a first of line segment depths being less than a first predicted depth associated with a first of the predicted measurement points, and a second of line segment depths being less than a second predicted depth associated with a second of the predicted measurement points.

In furtherance of the first embodiments, the method further comprises receiving image frame data including a depth value associated with each 2D spatial position within the image frame, displaying the image frame on a display screen, and receiving the indication of the pair measurement points further comprises receiving a user selection indicative of two or more spatial coordinates within the image frame.

In furtherance of the first embodiments, the method further comprises collecting the image frame data with at least one of: a plurality of cameras; a time of flight camera; or a structured light illuminator.

In one or more second embodiments, a computerized imaging device, comprises an input port to receive an indication of a pair measurement points within an input image frame, and one or more processors coupled to the input port. The processors are to determine a 3D spatial coordinate for each of a plurality of points along a measurement line defined by the pair of measurement points, filter the 3D spatial coordinates associated with the measurement line to account for outliers, map the pair of measurement points to a pair of predicted points based on a function of the filtered 3D spatial coordinates, and determine a distance between the pair of predicted points. The device further comprises a memory to store the distance in association with the input image frame.

In furtherance of the second embodiments, to filter the 3D spatial coordinates, the one or more processors are to fit a linear structure in the 3D spatial coordinates, to map the pair of measurement points, the one or more processors are to map the measurement points to the pair of predicted points based on the linear structure in the 3D spatial coordinates, and to determine the distance between the pair of predicted points, the one or more processors are to compute the Euclidean distance between the pair of predicted points.

In furtherance of the second embodiments immediately above, to map the pair of measurement points, the one or more processors are to compute a function of a plane based on the 3D spatial coordinates, and project the pair of measurement points onto the plane.

In furtherance of the second embodiments, to fit the linear structure to the 3D spatial coordinates, the one or more processors are to perform a robust total least squares (TLS) fit of the 3D spatial coordinates associated with the measurement line.

In furtherance of the second embodiments immediately above, to perform the robust TLS fit, the one or more processors are to determine a robust estimate of the multivariate location and scatter of the 3D spatial coordinates associated with the measurement line, and determine a principal component based on an Eigen decomposition of the scatter.

In furtherance of the second embodiments immediately above, to determine the robust estimate of the multivariate location and scatter, the one or more processors are to compute the minimum covariance determinant (MCD) estimator to find h observations of the 3D spatial coordinates associated with the measurement line associated with a covariance matrix having the lowest determinant. To map the pair of measurement points to the pair of predicted points, the one or more processors are to determine if the h observations are all on a hyperplane, and compute the predicted points based on a predicted depth associated with the hyperplane in response to the h observations all being on the hyperplane, or project the measurement points onto a line in response to the h observations not all being on the hyperplane.

In furtherance of the second embodiments, the one or more processors are further to construct a pair of line segments, each extending the measurement line beyond one of the measurement points, determine a depth associated with each of the line segments, and determine the distance between the measurement points independent of the pair of predicted points in response to both a first of line segment depths being less than a first predicted depth associated with a first of the predicted measurement points, and a second of line segment depths being less than a second predicted depth associated with a second of the predicted measurement points.

In furtherance of the second embodiments, the device further includes at least one of: a plurality of cameras, a time or flight camera, or a structured light source to collect a depth value associated with each 2D spatial position within the image frame. The device further includes a display screen to display the image frame, and the device further includes a user interface to receiving a user selection indicative of two or more spatial coordinates within the image frame.

In one or more third embodiments, one or more computer-readable storage media has instructions stored thereon, which when executed by a processor, cause the processor to perform a method comprising receiving an indication of a pair measurement points within an input image frame, determining a 3D spatial coordinate for each of a plurality of points along a measurement line defined by the pair of measurement points, filtering the 3D spatial coordinates to account for outliers, mapping the pair of measurement points to a pair of predicted points based on the filtered set of 3D spatial coordinates, determining a distance between the pair of predicted points, and storing the distance to a memory in association with the pair of measurement points.

In furtherance of the third embodiments, the media further comprises instructions stored thereon, which when executed by the processor, further cause the processor to perform the method further comprising filtering the 3D spatial coordinates further comprises fitting a linear structure to the 3D spatial coordinates, mapping the pair of measurement points to the pair of predicted points based on the linear structure, and determining the distance between the pair of predicted points further comprises computing the Euclidean distance between the pair of predicted points. Fitting the linear structure to the 3D spatial coordinates comprises performing a robust total least squares (TLS) fit of the 3D spatial coordinates associated with the measurement line. The TLS fit further comprising determining a robust estimate of the multivariate location and scatter of the 3D spatial coordinates associated with the measurement line, and determining a principal component based on an Eigen decomposition of the scatter.

In furtherance of the third embodiments immediately above, determining the robust estimate of the multivariate location and scatter further comprises computing the minimum covariance determinant (MCD) estimator to find h observations out of the 3D spatial coordinates associated with the measurement line associated with a covariance matrix having the lowest determinant, and mapping the pair of measurement points to the pair of predicted points further comprises determining if the h observations are all on a hyperplane, and computing the predicted points based on a predicted depth associated with the hyperplane in response to the h observations all being on the hyperplane, or projecting the measurement points onto a line in response to the h observations not all being on the hyperplane.

In one or more fourth embodiments, a computerized imaging device comprises a means to perform any one of the first embodiments.

In one or more fifth embodiment, a computer-readable storage media has instructions stored thereon, which when executed by a processor, cause the processor to perform any one of the first embodiments.

It will be recognized that the embodiments are not limited to the exemplary embodiments so described, but can be practiced with modification and alteration without departing from the scope of the appended claims. For example, the above embodiments may include specific combination of features. However, the above embodiments are not limited in this regard and, in embodiments, the above embodiments may include undertaking only a subset of such features, undertaking a different order of such features, undertaking a different combination of such features, and/or undertaking additional features than those features explicitly listed. Scope should, therefore, be determined with reference to the appended claims, along with the full scope of equivalents to which such claims are entitled.

What is claimed is:

1. A computer implemented method for point-to-point measurement of image data, the method comprising:
    receiving an indication of a pair measurement points within an input image frame;
    determining a 3D spatial coordinate for each of a plurality of points along a measurement line defined by the pair of measurement points;
    estimating a multivariate location and scatter of the 3D spatial coordinates associated with the measurement line by computing a minimum covariance determinant (MCD) estimator for the 3D spatial coordinates, the MCD identifying a covariance matrix having the lowest determinant for a predetermined threshold number of the 3D spatial coordinates;
    determining if the predetermined threshold number of the 3D spatial coordinates are all on a hyperplane;
    computing a pair of predicted points by:
        evaluating an equation of the hyperplane at the measurement points in response to the predetermined threshold number of the 3D spatial coordinates all being on the hyperplane; or
        projecting the measurement points onto a principal component determined from an Eigen decomposition of the scatter, in response to the predetermined threshold number of the 3D spatial coordinates not all being on the hyperplane;
    determining a Euclidean distance between the pair of predicted points; and
    storing the distance to a memory in association with the pair of measurement points.

2. The method of claim 1, further comprising:
    constructing a pair of line segments, each extending the measurement line beyond one of the measurement points;
    determining a depth associated with each of the line segments; and
    determining the distance between the measurement points independent of the pair of predicted points in response to both a first of line segment depths being less than a first predicted depth associated with a first of the predicted measurement points, and a second of line segment depths being less than a second predicted depth associated with a second of the predicted measurement points.

3. The method of claim 1, further comprising:
    receiving image frame data including a depth value associated with each 2D spatial position within the image frame;
    displaying the image frame on a display screen; and
    wherein receiving the indication of the pair measurement points further comprises receiving a user selection indicative of two or more spatial coordinates within the image frame.

4. The method of claim 1, further comprising:
    collecting the image frame data with at least one of:
        a plurality of cameras;
        a time of flight camera; or
        a structured light illuminator.

5. A computerized imaging device, comprising:
    an input port to receive an indication of a pair measurement points within an input image frame;
    one or more processors coupled to the input port, the processors to:
        determine a 3D spatial coordinate for each of a plurality of points along a measurement line defined by the pair of measurement points;
        estimate a multivariate location and scatter of the 3D spatial coordinates associated with the measurement line from the minimum covariance determinant (MCD) estimator computed for the 3D spatial coordinates, the MCD identifying a covariance matrix having the lowest determinant for a predetermined threshold number of the 3D spatial coordinates;
        determine if the predetermined threshold number of the 3D spatial coordinates are all on a hyperplane;
        compute a pair of predicted points from:
            an evaluation of an equation of the hyperplane at the measurement points in response to the predetermined threshold number of the 3D spatial coordinates all being on the hyperplane; or
            a projection of the measurement points onto a principal component determined from an Eigen decomposition of the scatter, in response to the predetermined threshold number of the 3D spatial coordinates not all being on the hyperplane; and
        determine a Euclidean distance between the pair of predicted points; and
    a memory to store the distance in association with the input image frame.

6. The device of claim 5, wherein the one or more processors are further to:
    construct a pair of line segments, each extending the measurement line beyond one of the measurement points;
    determine a depth associated with each of the line segments; and
    determine the distance between the measurement points independent of the pair of predicted points in response to both a first of line segment depths being less than a first predicted depth associated with a first of the predicted measurement points, and a second of line segment depths being less than a second predicted depth associated with a second of the predicted measurement points.

7. The device of claim 5, further comprising:
at least one of: a plurality of cameras, a time or flight camera, or a structured light source to collect a depth value associated with each 2D spatial position within the image frame;
a display screen to display the image frame; and
a user interface to receiving a user selection indicative of two or more spatial coordinates within the image frame.

8. One or more non-transitory computer-readable storage media, with instructions stored thereon, which when executed by a processor, cause the processor to perform a method comprising:
receiving an indication of a pair measurement points within an input image frame;
determining a 3D spatial coordinate for each of a plurality of points along a measurement line defined by the pair of measurement points;
estimating a multivariate location and scatter of the 3D spatial coordinates associated with the measurement line by computing a minimum covariance determinant (MCD) estimator for the 3D spatial coordinates, the MCD identifying a covariance matrix having the lowest determinant for a predetermined threshold number of the 3D spatial coordinates;
determining if the predetermined threshold number of the 3D spatial coordinates are all on a hyperplane;
computing a pair of predicted points by:
evaluating an equation of the hyperplane at the measurement points in response to the predetermined threshold number of the 3D spatial coordinates all being on the hyperplane; or
projecting the measurement points onto a principal component determined from an Eigen decomposition of the scatter, in response to the predetermined threshold number of the 3D spatial coordinates not all being on the hyperplane;
determining a Euclidean distance between the pair of predicted points; and
storing the distance to a memory in association with the pair of measurement points.

9. The media of claim 8, further comprising instructions to cause the processors to perform a method further comprising:
constructing a pair of line segments, each extending the measurement line beyond one of the measurement points;
determining a depth associated with each of the line segments; and
determining the distance between the measurement points independent of the pair of predicted points in response to both a first of line segment depths being less than a first predicted depth associated with a first of the predicted measurement points, and a second of line segment depths being less than a second predicted depth associated with a second of the predicted measurement points.

10. The media of claim 8, wherein receiving the indication of the pair measurement points further comprises receiving a user selection indicative of two or more spatial coordinates within the image frame.

11. The media of claim 8, further comprising instructions to cause the processors to perform a method further comprising collecting the image frame data with at least one of:
a plurality of cameras;
a time of flight camera; or
a structured light illuminator.

* * * * *